US005895542A

United States Patent [19]

Wadzinski

[11] Patent Number: 5,895,542

[45] Date of Patent: Apr. 20, 1999

[54] COATER AND A METHOD FOR COATING A SUBSTRATE

[75] Inventor: Michael J. Wadzinski, Menosha, Wis.

[73] Assignee: Appleton Papers Incorporated, Appleton, Wis.

[21] Appl. No.: 09/040,380

[22] Filed: Mar. 18, 1998

Related U.S. Application Data

[63] Continuation of application No. 08/347,063, Nov. 23, 1994.

[51] Int. Cl.$^{6}$ ........................ B29B 15/00

[52] U.S. Cl. ........ 156/242; 156/273.3; 156/380.9; 156/498; 156/501; 118/69; 118/642; 427/372.2; 427/374.5

[58] Field of Search ........ 156/242, 272.2, 156/273.3, 379.6, 380.9, 498, 500, 501; 118/69, 641, 642; 427/372.2, 374.1, 374.4, 374.5

[56] References Cited

U.S. PATENT DOCUMENTS

| | | | |
|---|---|---|---|
| 2,029,273 | 1/1936 | Montgomery et al. | 101/483 |
| 2,214,564 | 9/1940 | Montgomery et al. | 428/452 |
| 2,214,566 | 9/1940 | Montgomery et al. | 428/342 |
| 2,316,202 | 4/1943 | Warner | 427/362 |
| 2,337,013 | 12/1943 | Bradner et al. | 427/362 |
| 2,360,919 | 10/1944 | Warner | 427/362 |
| 2,554,662 | 5/1951 | Cowgill | 427/361 |
| 2,759,847 | 8/1956 | Frost et al. | 428/409 |
| 2,776,226 | 1/1957 | Hart | 428/477.7 |
| 2,780,563 | 2/1957 | Frost et al. | 427/362 |
| 2,819,184 | 1/1958 | Smith et al. | 427/362 |
| 2,919,205 | 12/1959 | Hart | 427/362 |
| 2,934,467 | 4/1960 | Bergstein | 428/452 |
| 2,943,954 | 7/1960 | Robinson et al. | 427/362 |
| 2,950,214 | 8/1960 | Smith | 427/362 |
| 3,389,036 | 6/1968 | Rudolph et al. | 427/428 |
| 3,415,671 | 12/1968 | Rice | 427/362 |
| 3,668,058 | 6/1972 | Pappadakis | 428/215 |
| 3,681,116 | 8/1972 | Reich | 427/362 |
| 3,830,199 | 8/1974 | Saito et al. | 118/637 |
| 3,982,056 | 9/1976 | Holder, Jr. | 427/361 |
| 4,264,644 | 4/1981 | Schaetti | 427/55 |
| 4,370,356 | 1/1983 | Bok et al. | 427/38 |
| 4,571,351 | 2/1986 | Schaetti | 427/288 |
| 5,073,221 | 12/1991 | Waitts et al. | 156/253 |
| 5,492,722 | 2/1996 | Tait et al. | 427/211 |

FOREIGN PATENT DOCUMENTS

| | | |
|---|---|---|
| 780835 | 3/1968 | Canada . |
| 888099 | 12/1971 | Canada . |
| 428057 | 5/1991 | European Pat. Off. . |
| 1112093 | 5/1968 | United Kingdom . |

OTHER PUBLICATIONS

Textured Resin Coated Photographic Papers, *Research Disclosure*, Sep. 1980, pp. 385.

"Thermal Conductivity and the Mechanism of Energy Transport," Chapter 8, pp. 243–309.

"High Speed Extrusion Coating is a Complex Operation–II," G.L. Booth, *Paper Trade Journal*, Feb. 2, 1970, pp. 31–35.

"Surface of Coated Grades Enhanced by High–Intensity Infrared Drying," p. Collette, *Pulp & Paper*, May 1990 pp. 89–95.

"New Developments in Flame Treating," T. Lindland and C. Granville, 1990 *Polymers, Laminations & Coatings Conference*, Book 2, Sep. 1990 pp. 897–904.

"Theory of Field Evaporation of the Surface Layer in Jellium and Other Metals," E.R. McMullen, J.P. Perdew, *Physical Review*, Aug. 1987 pp. 2598–2605.

"Ultrahigh Finish Coated Papers–Cast Coating and Other Processes," J.P. Casey, *Tappi Monograph Series*, 1965, pp. 74–86.

*Primary Examiner*—James Sells

*Attorney, Agent, or Firm*—Birch, Stewart, Kolasch & Birch, LLP

[57] ABSTRACT

A coater and method allow for an essentially dry coating process. In this process, a coating is continually applied to a casting drum. This casting drum will rotate to move the coating passed infrared drying units. The exterior face of the casting drum is cooled. The temperature of the coating will rise except at an area adjacent the casting drum. This will reduce the water concentration of the coating except at the area adjacent the casting drum. This arrangement prevents the coating from bonding to the casting drum. Therefore, the coating can easily be removed from the casting drum and applied to a final substrate.

21 Claims, 3 Drawing Sheets

FIG. 8a
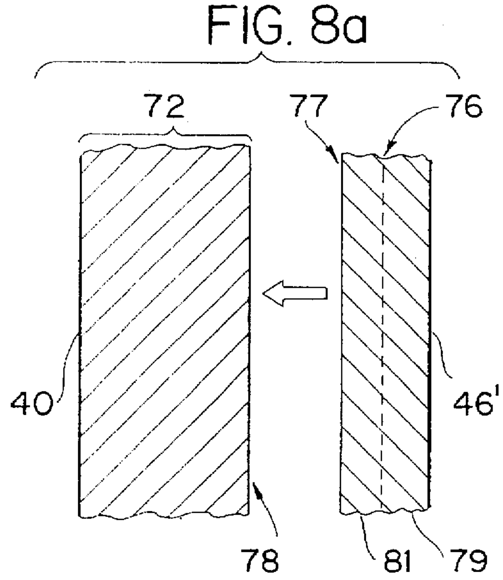
FIG. 9a
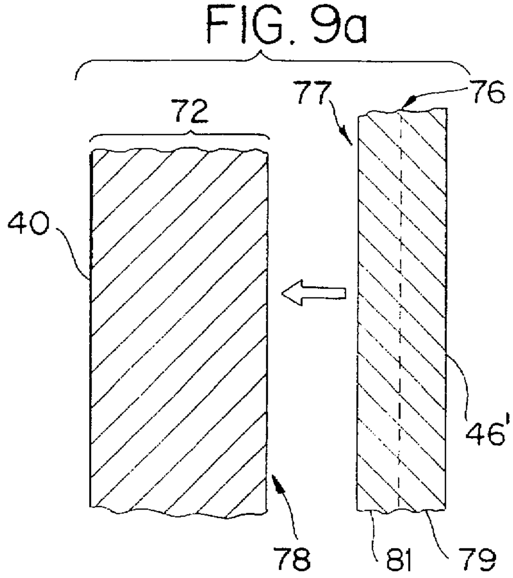
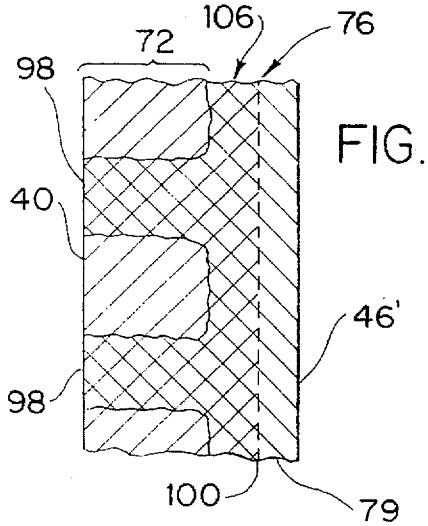
FIG. 8b
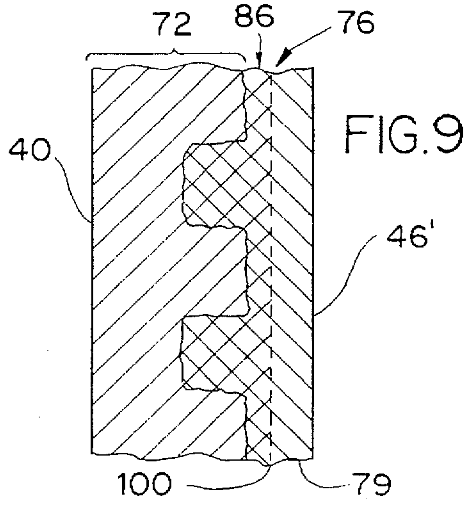
FIG. 9b
FIG. 8c
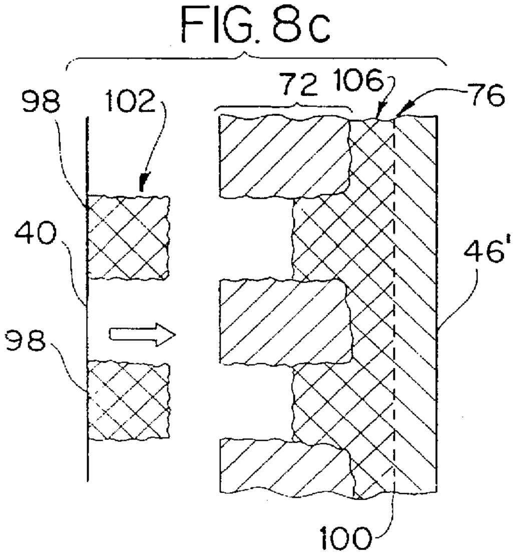
FIG. 9c
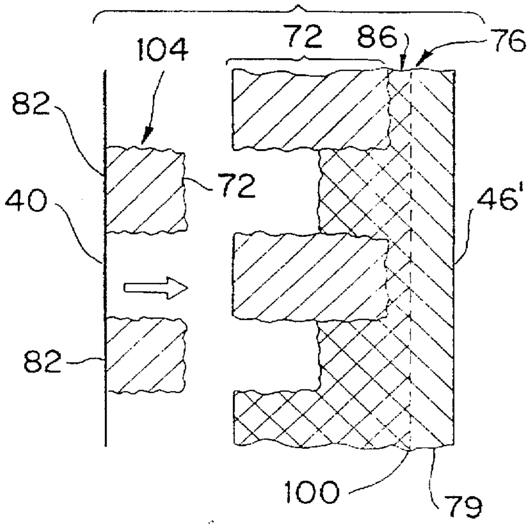

COATER AND A METHOD FOR COATING A SUBSTRATE

This application is a continuation of copending application No. 08/347.063, filed on Nov. 23,1994, the entire contents of which are hereby incorporated by reference.

BACKGROUND OF THE INVENTION

1. Field of the Invention

The present invention relates to a method for coating a substrate as well as a precast coater. The method and precast coater allow for high solids, almost dry coating. The coating is dried on a chilled casting drum which is surrounded by external infrared heating units. The coating becomes tacky and is then peeled onto a receiving substrate.

2. Description of the Background Art

Coating methods and precast coaters are known for applying a coating onto a substrate, such as paper, paperboard, chipboard, etc. However, many problems exist with conventional coaters and coating methods. For example, all popular currently used coating processes must deal with using an appropriate amount of water such that the coating can take place while trying to avoid damage to the substrate.

It is this use of water in wetting and/or rewetting the coating or substrate which, in fact, damages the substrate and coating. The wetting and/or rewetting of the coating or substrate results in many dimensional substrate stability problems, wasted coating material, quality problems and increased process cost and complexity for the coated substrate.

One example of a conventional coating method is found in U.S. Pat. No. 2,934,467 to Bergstein. The method disclosed in this patent has not caught on in the industry because it is very slow to run (for example, 350 feet per minute).

Another drawback to this prior art method is that it is difficult to separate the coating from the casting drum on which the coating is formed. Separately applied water based adhesives must be used to get the coating to release from this casting drum. The coating is unevenly penetrated with the water based adhesive.

Another problem with existing precast coaters and coating methods is that they require relatively thick coating layer. This can cause difficulties in handling the coating and can also increase cost for the coating.

In conventional systems, it is also difficult to adequately dry the coating in a space efficient manner. There is also a need to operate the system at a fast pace. Often, excessive drying units and space for these units are needed. The extra space and many drying units required add to the costs and complexity of existing coaters.

Accordingly, a need in the art exists for a coater which can effectively apply coating to a substrate with minimal or no wetting or rewetting of the substrate and/or coating.

SUMMARY OF THE INVENTION

Accordingly, it is a primary object of the present invention to provide a method for coating and a coater which will effectively apply a coating to a substrate.

Another object of the present invention is to eliminate or reduce wetting or rewetting of the substrate or coating. In this respect, it is an object to avoid water or solvent based stripping adhesives which can weaken the coating. If is also an object to avoid baggy rolls, tunnel wrinkles, dryer induced sheet curl, poor sheet aspect and cockle associated with the liquid acting as the coating vehicle.

It is a further object of the present invention to provide a method and coater which is easy to operate requiring less equipment, capital investment and inventory than conventional arrangements. This method and coater should produce less scrap than conventional designs, should have greater base stock flexibility, should eliminate certain processing steps and should minimize the space required to operate the system.

A further object of the present invention is to provide for a coater and method which can be more flexible with respect to the binders used in the coating formula. Optimum levels of binders can then be used to meet product specifications and the cost for producing a coated substrate can be minimized.

Yet another object of the present invention is to provide a coater and method which has a high tolerance to dirt, "hickies" and color variation. This coater and method should provide for better substrate coverage, avoid coating interaction through the substrate, eliminate problems with base sheet pin holes and avoid dusting through binder migration in coatings.

This coater and method has a further object to avoid film split patterns and streaks on the coated surface of the produced substrate.

A further object of the present invention is to provide for easy changeover of the coater so that the texture and appearance of the produced substrate can be varied while ensuring that the coating is properly adhered to the substrate with minimal waste.

An additional object of the present invention to provide a coater and method which can produce a high gloss product or a product with gelatin capsules used in carbonless paper.

A further object of the present invention is to provide a coater and method which is also suitable in a hot melt, extruder application.

Yet another object of the present invention is to provide a coater and method which is easy to maintain and operate and which is highly reliable.

These and other objects of the present invention are fulfilled by a method for coating a substrate which comprises the steps of supplying a coating to a casting drum. The steps also include cooling of the exterior face of the casting drum and drying the coating on the casting drum with infrared drying units. The cooling of the exterior face of the casting drum along with the infrared drying will avoid bonding of the coating to the casting drum. After drying, a substrate moves into contact with the coating on the drum to peel the coating from the casting drum onto the substrate.

These objects of the present invention are also fulfilled by a precast coater comprising a rotatable casting drum having an exterior face. A coating supply or means for supplying a coating continuously to the exterior face of the casting drum. Means are provided for avoiding bonding of the coating to the casting drum. These means include infrared drying units which dry the outer face of the coating as well as means for cooling the exterior face of the casting drum. The infrared drying units surround only a portion of the casting drum and will at least partially dry the coating. The means for cooling comprise a cooling system provided within the casting drum. After the coating has been dried by the infrared drying units, a rotatable drum moves a substrate against the coating on the casting drum in order to peel the coating from the casting drum.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

FIG. *6a* is a graph showing temperature and water concentration of a coating during an initial application of the coating to a conventional heated casting drum;

FIG. *6b* is a graph showing an intermediate drying stage for the coating on a conventional heated casting drum;

FIG. *6c* is a graph showing a final drying stage of the coating on a conventional heated casting drum in a high solids operation;

FIG. *6d* is a graph showing the final drying stage of the coating on a conventional heated casting drum with essentially no remaining water;

FIG. *7a* is a graph showing temperature and water concentration of a coating during an initial application of the coating to the coater of the present invention;

FIG. *7b* is a graph showing an intermediate drying stage for the coating of the present invention;

FIG. *7c* is a graph showing a final drying stage of the coating of the present invention in a high solids operation;

FIG. *7d* is a graph showing the final drying stage of the coating of the present invention in a pseudo-hot melt application with little water remaining in the coating;

FIG. *8a* shows the first step leading to coating pick in a conventional precast arrangement before the substrate moves into contact with an adhesive coated substrate;

FIG. *8b* shows the next step leading to coating pick in the conventional precast arrangement before the substrate moves away from the casting drum;

FIG. *8c* shows coating pick and surface disruption of the coating in the conventional precast arrangement after the substrate moves away from the casting drum;

FIG. *9a* shows the first step in revised explanation of coating pick as taught by this invention before the substrate moves into contact with an adhesive coated substrate;

FIG. *9b* shows the next step in a revised explanation of coating pick as taught by this invention before the substrate moves away from the casting drum;

FIG. *9c* shows the coating pick and surface disruption of the coating in a conventional precast arrangement but with a revised explanation of the picking phenomena as taught by this invention.

DETAILED DESCRIPTION OF THE PREFERRED EMBODIMENTS

Figure 1:
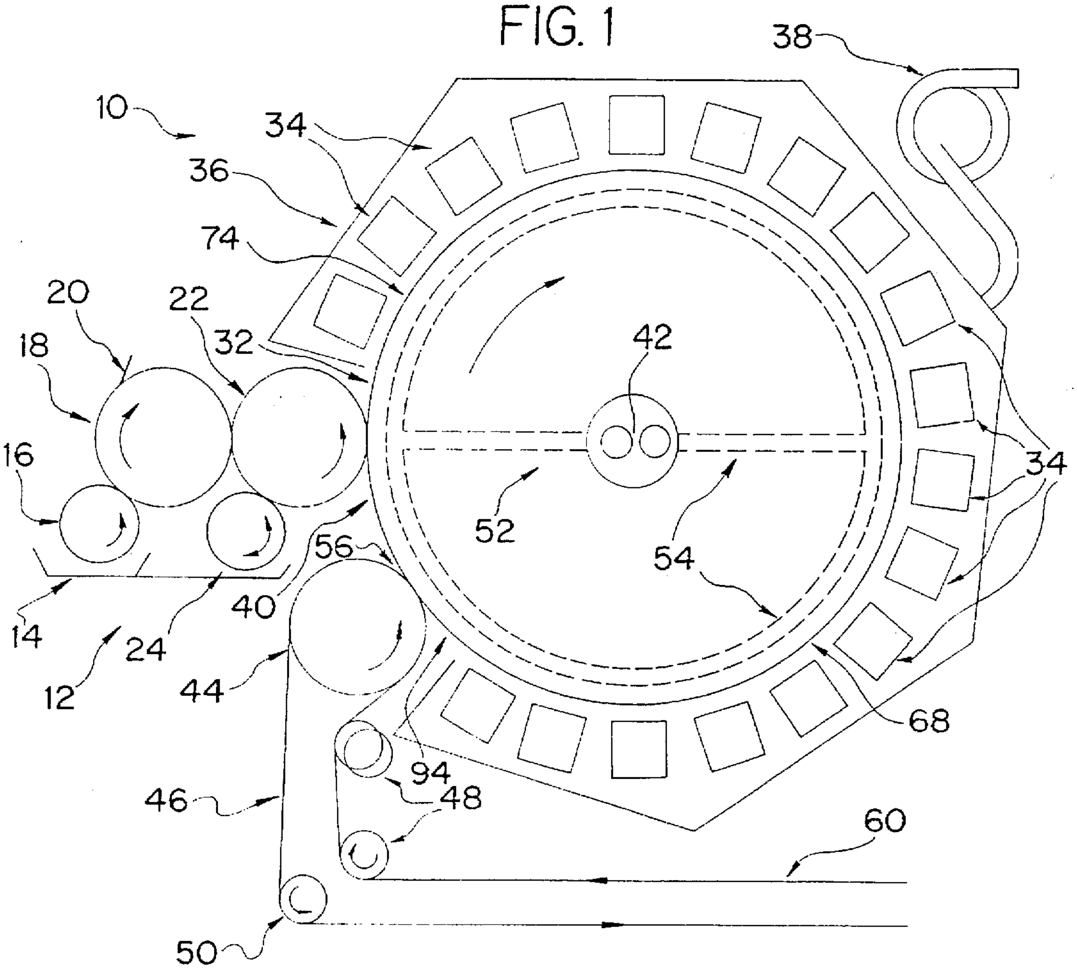
FIG. 1 is a side schematic view of one embodiment of a coater of the present invention.

Referring in detail to the drawings and with particular reference to FIG. 1, a precast coater 10 is shown. The precast coater 10 includes means for supplying a coating or coating supply 12. This coating supply 12 includes a coating pan 14, a pick-up roll 16, an engraved anilox roll 18 and a rubber covered plate roll 22. Instead of using a pick-up roll 16, a coating foil (not shown) could be used. Adjacent the anilox roll 18 is a doctor blade 20 for removing excess coating from the anilox roll 18. A smearing roll 24 or coating scrappers for controlling coating width is also provided in the coating supply 12.

Figure 2:
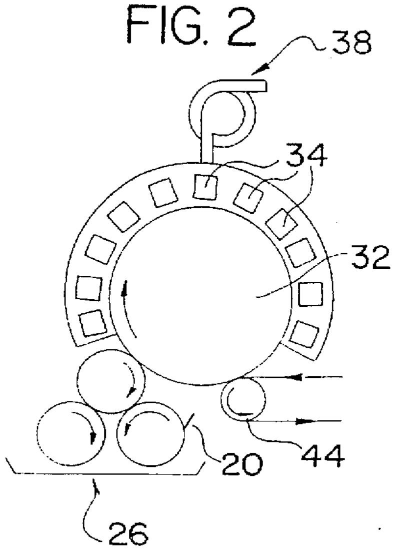
FIG. 2 is a side schematic view of the coater of the present invention with a three roll coating supply.
Figure 3:
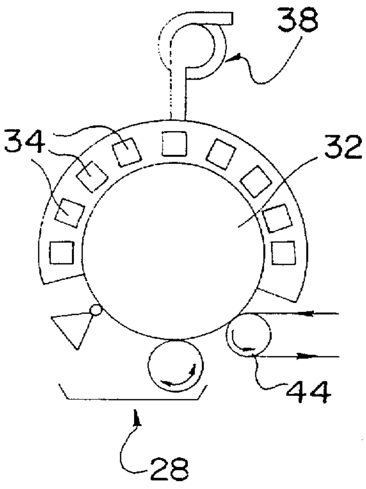
FIG. 3 is a side schematic view of the coater of the present invention with a rod coater as the coating supply.
Figure 4:
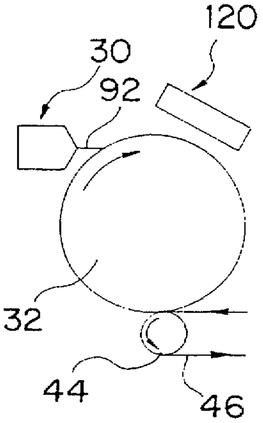
FIG. 4 is a side perspective view of the coater of the present invention with an extruder as the coating supply.

It should be appreciated that any known coating supply or means for coating can be provided. For example, as shown in FIG. 2, a three roll applicator 26 can be used. Alternatively, a rod coater 28 can be provided or an extruder 30 can be used as shown in FIGS. 3 and 4, respectively.

Coating in the coating pan 14 will be supplied via pick-up roll 16, anilox roll 18 and rubber coated plate roll 22 to the casting drum 32. This coating can be an undried coating of various solids and viscosities. The rolls of the coating supply 12 will rotate either in a matched or mismatched speed depending on the coat weight and coating pattern requirements.

While a particular casting drum 32 has been shown, it should be appreciated that this casting drum 32 can be altered if so desired. In particular, it is possible to substitute a less highly polished casting drum surface to change the surface appearance (texture) of the produced substrate because of the improved release characteristics of the present invention. These release characteristics will be described in more detail below.

After the coating 74 is applied to the casting drum 32, it is carried past a series of infrared drying units 34. A ventilation hood 36 surrounds these infrared drying units. A ventilation fan 38 is provided for exhausting the ventilation hood 36.

The infrared drying units 34 are contemplated as being infrared coating drying units. These drying units will allow a higher coating weight, greater drying efficiency and higher operating speed. Infrared energy will be applied from the drying units 34 to the coating 74. The coating will have a first side which is adjacent the exterior face 40 of the casting drum 32. The second side of the coating is distal from the exterior face 40. The infrared drying units 34 will apply infrared energy (heat) to and through the second side of the coating.

The casting drum 32 is rotatable about axis 42. Therefore, coating 74 applied by the coating supply 12 can be rotated past the infrared drying units 34 and to a backing roll or impression roll 44. Depending on the type of binder used (synthetic or natural), the coating on the casting drum 32 can be dried to a very high or totally dry solids composition before it is applied to a substrate 46 at the backing roll or impression roll 44. This substrate 46 can be paper, paperboard, chipboard, internally proofed boards, foil laminated boards, non-fibrous films or any other suitable substrate for receiving a coating. While the substrate 46 is shown as being a flexible material, it should be appreciated that this substrate can be rigid material which is moved into contact with the coating on the casting drum 32.

The substrate 46 will move past the carrier rollers 48, around the backing roll or impression roll 44 and passed the downstream roller 50. The backing roll or impression roll 44 will move the substrate adjacent the casting drum 32 such that the substrate 46 will engage the coating. As will be described in more detail below, the coating will be peeled from the drum and adhered to the substrate at nip 56. The carrier rollers 48 have a configuration to allow for maximum dryer length on the casting drum 32 and will ensure a flat wrinkle-free web contacts the coating on the casting drum.

The backing roll or impression roll 44 can be covered with a soft material and may be internally cooled to protect the soft cover. However, it is not necessary for this backing roll or impression roll 44 to have this particular structure. Unlike prior art designs, this backing roll or impression roll 44 will not require internal cooling for protection from heat. No hot surfaces come into direct contact with these rolls during operation. Therefore, the cost of the instant coater can be reduced compared to prior art devices.

After the coated substrate leaves the backing roll or impression rolls 44, it will be substantially or totally dry. Because of the efficiency of the infrared drying units 34, these units can be selectively used in any desired configuration. For example, every other drying unit can be activated or only a couple of the drying units which are first encountered by the coating can be activated or any other arrangement can be used. This selectability facilitates various coating requirements will still removing a desired quantity of water from the coating.

Due to the use of infrared drying units 34 and in particular high-intensity infrared drying units, problems of limited drying length and drying efficiency found in the prior art can be avoided. These drying units 34 are particularly efficient and compact. A limited drying distance is provided around the circumference of the casting drum 32. This limited circumference can be used much more efficiently with infrared drying units 34. Therefore, the size of the precast coater 10 may be compact and/or increased coater feeding speeds can be obtained.

To illustrate, a conventional convection style air flotation dryer requires forty feet of effective drying length to dry a 40 percent solid coating at 3,000 feet per minute. A compact infrared drying unit 34, on the other hand, only requires four to five feet of effective length.

In order to improve the efficiency of the drying units 34, a coating 68 that reflects infrared radiation (Ag, Au, Chromium, for example) can optionally be applied to the surface of the casting drum 32. The addition of this coating 68 affords further efficiency enhancements over conventional methods since the reflective coated casting drum 32 is much more effective at reflecting infrared energy into the coating compared to a paper web in this same position as is a conventional infrared application.

Profile uniformity regarding coating moisture and temperature can be improved in the present invention. The use of infrared drying units 34 particularly aid in profile uniformity with regard to the coating moisture and the temperature. These units are typically sectionalized to offer cross direction moisture control.

As the coating is carried by the casting drum 32 and dried by the infrared drying units 34, the exterior face 40 of the casting drum 32 will be cooled by a means for cooling or a cooling system 52. This cooling system 52 is located inside the casting drum 32 and includes fluid passages 54. Water or other suitable cooling medium may be circulated through these passages 54 in order to remove heat from the outer regions of the casting drum 32. In this manner, the exterior face of the casting drum 32 will be cooled.

As will be described in more detail below, this cooling enables the coating to remain essentially unbonded to the casting drum surface and to properly release from the casting drum when the coating reaches substrate 46 at the nip 56.

Figure 5:
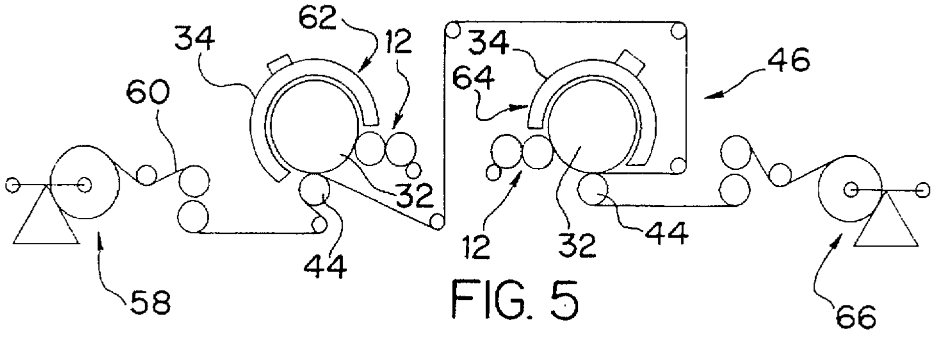
FIG. 5 is a side schematic view of a substrate processing system of the present invention.

Turning now to FIG. 5, a schematic overview of the substrate processing system is illustrated. A turret winder 58 is provided for supplying an uncoated substrate 60. A first coating station 62 is provided for coating a first side of the substrate. The substrate will then move to a second coating station 64 whereat the other side of the substrate can be coated. The substrate is then wound on a downstream turret winder 66. It should be appreciated that either the first coating station 62 or the second coating station 64 can be omitted such that only one side of the substrate is coated.

Referring to FIGS. **6*a* through 7*d*, graphs showing drying conditions for the coating are illustrated. In FIGS. 6*a* through 6*d*, drying conditions for coatings in conventional precast coaters are illustrated while FIGS. 7*a* through 7*d* illustrate drying conditions for coatings in the present invention. The coatings shown in FIGS. 6 and 7 both have the same coating thicknesses 80. The side of the graph 82 illustrates the side of the coating closest to the exterior face 40 of the casting drum 32. The side 84 of the graph illustrates the coating-air interface. This coating side will contact the substrate 46 and will face the infrared drying units 34. The upper line 86 in each graph represents temperature whereas the lower line 88** represents water concentration of the coating.

As shown in FIG. **6*a*, in conventional precast coaters, the casting drum 32 is internally heated in order to dry the coating. The temperature of the coating $T_H$ at the heated drum surface side 82 is initially raised. However, the temperature $T_S$ of the coating-air interface side 84** is the same as the wet bulb temperature $T_{WB}$ or ambient temperature.

Figure 6A:
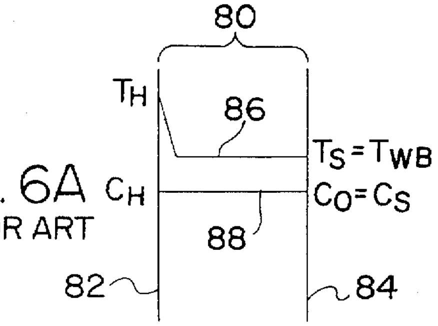
FIG. 6A PRIOR ART
Figure 6B:
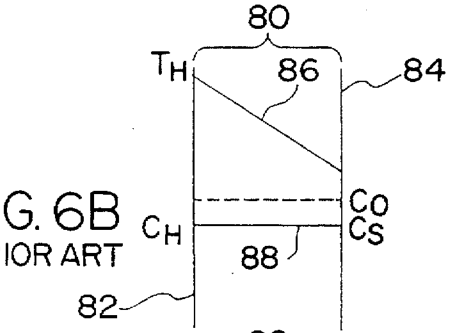
FIG. 6B PRIOR ART
Figure 6C:
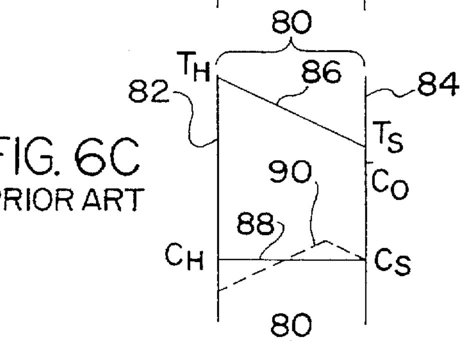
FIG. 6C PRIOR ART
Figure 7C:
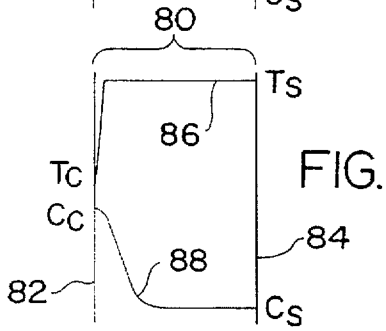
Figure 6D:
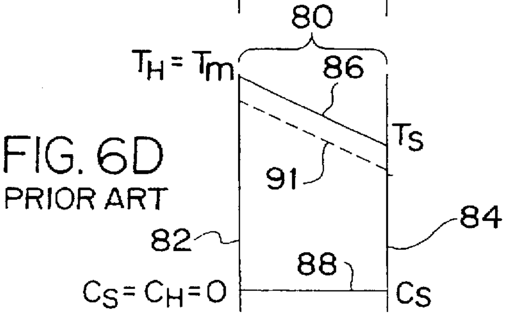
FIG. 6D PRIOR ART

FIGS. **6*a*, 6*b*, 6*c* and 6*d* show the successive stages of the coating during drying. FIG. 6*a* indicates an initial application stage and FIG. 6*b* indicates an intermediate drying stage. FIGS. 6*c* and 6*d* both represent a final condition prior to application of the coating to the substrate for different applications. FIG. 6*c* indicates a high solids application while FIG. 6*d* indicates a pseudo-hot melt application where by virtue of using a synthetic binder with a melting point, the coating can be applied essentially dry with the melted binder acting as an adhesive. This would work much better with conditions produced in FIG. 7*d* as compared to FIG. 6*d***.

As can be seen from FIGS. **6*a* to 6*d*, the temperature of the coating indicated by line 86 increases more at the casting drum side 82 compared to the coating-air interface side 84. On the other hand, water concentration indicated by line 88 in the coating is initially equal. In particular, in FIG. 6*a*, the water concentration $C_H$ at the heated drum surface side 82 is approximately equal to the water concentration $C_S$ at the coating-air interface side 84. These water concentrations $C_H$, $C_S$ are equal to the initial water concentration $C_O$ of the coating. As the coating is dried from FIGS. 6*a* to 6*b*, it can be seen that the water concentration (line 88) of the coating decreases from the initial concentration $C_O$. The water concentration $C_H$ at the heated casting drum surface side 82 continues to equal the water concentration $C_S$ at the coating-air interface side 84**.

Prior to substrate application, the water concentration $C_H$ and $C_S$ has greatly decreased from the initial water concentration $C_O$ as seen in FIG. **6*c*. In a dry coating application (hot melt application) shown in FIG. 6*d*, the water concentration at the heated drum surface and at the coating-air interface $C_H$ and $C_S$ will be zero. When the water concentration in the coating layer approaches zero, the temperature of the coating layer will increase about its former equilibrium condition 91. If this temperature reaches the melting point of the coating binder $T_m$ it will do so at the coating drum coating interface 82 before the coating air interface 84**. This condition would not function as a pseudo hot-melt application since the coating would not be melted at the eventual coating-paper interface.

Figure 7A:
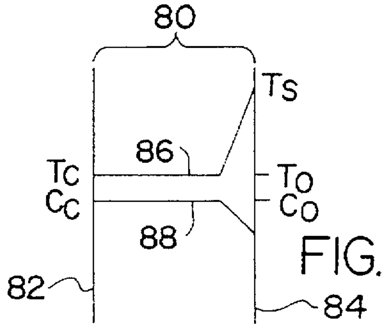
Figure 7B:
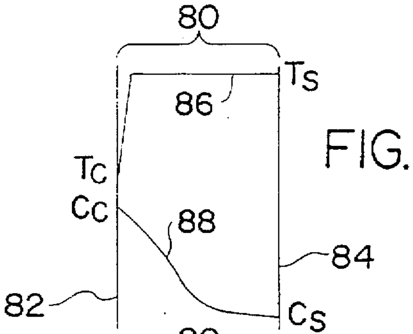

Instead of using a heated drum, the present invention, on the other hand, has the cooling system 52 for cooling the exterior face 40 of casting drum 32 and substituting radiant heating instead of convection heating. The drying conditions of the coating in the present invention are shown in FIGS. 7A through *7d*.

Initially, when the coating having a thickness 80 is on the present casting drum 32, the temperature $T_S$ at the coating-air interface side 84 is greatly increased as compared to the temperature $T_C$ at the cooled drum surface side 82 due to the infrared drying units 34 heating the coating. As can be seen at an intermediate drying stage in FIG. *7b*, a majority of the coating thickness is greatly heated. The temperature of the coating adjacent the exterior face 40 of the casting drum 32 (side 82), however, will be maintained at a low level as indicated by line 86. This reduced temperature is maintained by the cooling system 52.

As seen in FIG. *7c*, the final condition of the coating prior to substrate application in a high solids operation has a greatly increased temperature for the coating except adjacent the exterior face 40 of the casting drum 32 (side 82). Similarly, in a pseudo-hot melt application, the majority of the thickness 80 of the coating will have an increased temperature except at the area adjacent the exterior face 40 (side 82) as shown in FIG. *7d*. A portion of the coating of thickness 80 near the coating air interface 84 will be heated above the binders melting point $T_M$.

The temperature of the coating increases from an initial temperature $T_O$ while the water concentration of the coating decreases from an initial concentration $C_O$ in FIGS. *7a*, *7b* and *7d*.

As shown in FIG. *7a*, the water concentration of the coating (line 88) on the coating-air interface side 84 begins to decrease as the temperature increases. This coating-air interface side 84 is the second side of the coating which faces the infrared drying units 34. As the coating is dried in FIGS. *7b*, the water concentration will continue to decrease. However, adjacent the exterior face 40 of the casting drum (side 82) the water concentration $C_C$ is maintained at a level generally equal to the initial water concentration $C_O$ due to the cooling system 52 for the exterior face 40 of the casting drum 32. Therefore, the weakest bond will be formed at the interface between the coating 74 and the casting drum 32. This concentration at the casting drum surface, however, may be changed by using the cooling system to maintain different temperatures.

In other words, the cooled surface of the casting drum 32 allows for virtually no drying between the coating and the casting drum. This greatly decreases the adhesive forces and prevents static bonding forces between the coating 74 and casting drum 32. The moisture and temperature profiles produced by the infrared drying units 34 and cooling system 52 act to control the coaters boundary layer conditions resulting in certain advantages. For example, the moisture of the coating is substantially higher at the casting drum interface (side 82) as shown in FIGS. *7c* and *7d*. However, the temperature profile is essentially uniform throughout the coating layer during drying.

Because the drying rate is approximately three to ten times higher with infrared drying units 34 as opposed to conventional air convection, capillary action that might maintain a flat moisture concentration through the coating layer during convection drying cannot maintain this uniform moisture with infrared drying units. Consequently, the water air interface recedes. This results in little or no binder migration during infrared drying creating a more cohesive coating layer compared to conventional convection dryers. Not only is the internal cohesiveness of the coating layer improved over the prior art but additionally the coating layer has less adhesion to the casting drum.

The higher drying rates produced with the infrared drying units 34 require that a period of relaxed or no drying occur in a high solids, natural binding operation such as those shown in FIGS. *6c* and *7c*. This period will enable the moisture concentration to equalize throughout the coating layer. This redistribution of moisture in the coating layer after infrared drying will require that a portion of the casting drum length 94 have no infrared drying treatment. To accomplish this, infrared drying units 34 can be omitted from this area or infrared drying units which are present can simply be turned off. In this manner, the appropriate redistribution of moisture in the coating layer can occur.

It should be noted that the moisture and temperature profiles illustrated in FIGS. *6a* through *6d* assume that the influence of the higher temperature at the casting drum does not significantly influence capillary and surface tension forces in the coating compared to having a convection heat source at the coating surface at the casting drum air interface (as is commonly done in non-precast coating equipment). In other words, FIGS. *6a*–*6d* are essentially a best case scenario with regard to the prior art for the prior art precast coater. It is likely, however, that nonuniform moisture concentration may develop in the coating layer as indicated by the dashed line 90 in FIGS. *6c* and *6d*. Since surface tensions are lower and vapor pressure are higher with higher temperatures at the drum surface, this nonuniform moisture concentration will likely occur. Low moisture and high temperature would be conductive to high bonding strength between the exterior face 40 of the casting drum 32 and the coating.

The surface of the coating adjacent the casting drum 32 in the present invention will have a thin wet layer. This thin interfacial layer will be require minimal drying after its release from the casting drum 32. Since the bonding forces are weakest at the casting drum interface, the released characteristics of the coating layer are greatly enhanced in the present invention.

To explain this bonding phenomena, FIGS. *8a*–*9c* are provided. FIGS. *8a*–*c* and *9a*–*9c* indicate a conventional arrangement wherein a wet coating 81 is provided adjacent the substrate and a dry coating is provided against the casting drum 40 exterior surface. In other words, the right-hand side in FIGS. *8a* through *9c* shows the penetration depth 79 of wet water based adhesive in the substrate 46 while the left-hand side shows coating adjacent the exterior face of the casting drum 40. The different cross hatching in these figures represents the wet adhesive and dry coatings 81 and 72, respectively. This exterior face 40 of the casting drum would be the casting drum-dry coating interface.

It can be seen that the wet adhesive is unevenly distributed in these figures. The difference in FIGS. *8a* through *9c* is that the conventional thinking (of FIGS. *8a*–*8c*) is that areas with wet coating against the casting drum stick. The inventor, however, has found that dry coating and the hot casting drum stick very well. It is the break down of the interior of the coating layer caused by the wet adhesive that results in picking as will now be explained.

In conventional arrangements, the casting drum 40 is typically heated resulting in uneven drying of the coating as discussed above with reference to FIGS. *6a–6d*. In conventional arrangements, the wet adhesive coating 81 previously applied and carried by the substrate 46 is brought in contact with the dry coating 72. The wet adhesive coating 81 establishes an uneven penetration depth 86 and 106 within the previously dry coating layer 72 when applied to the substrate with a certain penetration depth 79. When the coating 72 is peeled away from the casting drum 40, the situation as shown in FIGS. 8*c* and 9*c* arises. A majority of the coating will be applied to the substrate 46 but a portion of the wet coating 102 and 104 will continue to adhere to the exterior face 40 of the casting drum.

To solve this problem, the prior art solution was to carefully control the amount of moisture on the wet adhesive layer 81 so as to prevent this moisture from reaching the casting drum 40 while allowing enough penetration of the adhesive 81 to partially attach the coating to the substrate 46' and remove the now partially dry coating 72 from the drum 40.

For example, in a conventional use of adhesives, the adhesives can be applied to the substrate to aid in removing the coating 72 from the casting drum 40. The adhesive would penetrate the substrate to a depth 79. The surface 76 of the substrate would be covered with the adhesive.

Therefore, there would be a wet water based adhesive-air interface 77, and a penetration depth 79 of wet water based adhesive beyond the surface 76 of the substrate as shown in FIGS. 8*a* and 9*a*. The substrate would be impregnated with the water based adhesive as indicated by numeral 79. The portion of the adhesive which does not penetrate into the substrate is indicated by numeral 81.

On the left-hand side of FIGS. 8*a* and 9*a*, the dry coating 72 has a dried coating-air interface 78 and a casting drum-dry coating interface at the exterior face 40 of the casting drum. As indicated by the arrow in FIGS. 8*a* and 9*a*, the wet and dry coatings are compressed together.

In FIG. 8*b*, areas 98 where water from the water based adhesive penetrate the dry coating 72 are formed. These areas 98 can extend to the exterior face 40 of the casting drum. Also, a coating-substrate-adhesive interface 100 is formed as indicated in FIG. 8*b*. Numeral 106 indicates the coating impregnated with water from the wet water based adhesive as taught by the prior art.

FIGS. 8*b* and 8*c* illustrate the theory or mechanism that explains why coating picking occurs on the casting drum surface 40 as taught by the prior art. The prior art teaches that penetration of the water based adhesive 81 through the dry coating 72 to the casting drum surface 40 will cause the wet areas of the casting drum 98 to adhere to the impregnated wet coating 106 as shown in FIG. 8*b*. FIG. 8*c* shows that when these layers are pulled off the casting drum surface 40, the wet areas 98 are bonded securely enough to the casting drum surface 40 to pull apart the impregnated coating layer 106 leaving behind deposits 102 on the casting drum surface 40 causing "picking".

By contrast, FIGS. 9*b* and 9*c* show the theory as taught by this inventor that explains why coating picking occurs on the hot casting drum surface. It is believed that the penetration of the wet adhesive 86 is retarded by temperature gradients in the dry coating layer 72 as shown in FIG. 9*b*. The level of wet adhesive penetration 86 results in weakening of the internal cohesive forces of the coatings layer where the penetration depth 86 is deepest. FIG. 9*c* shows that when these layers are pulled off the casting drum, dry areas 82 that have their cohesion undermined internally by excessive wet adhesive penetration pull particles of coating 104 which remain on the casting drum surface causing "picking".

Using a cooled casting drum surface would not be taught by the prior art since a wet casting drum surface interfaced with wet coating is taught to cause picking.

The key to releasing the coating from the casting drum 32 is a function of comparative adhesive/cohesive forces between the casting drum and coating, internal cohesive coating forces and forces between the substrate and coating. The weakest bond will be the interface that will release. Therefore, the present invention provides this weakest bond to be between the coating 74 and casting drum 32. Provision of the infrared drying units 34 will uniformly dry the coating in a short amount of time. The cooling of the casting drum exterior face 82 will provide a thin interfacial wet layer. At this layer, the bonding is weakest. Accordingly, when the coating is peeled from the casting drum 32, it is this layer which will give way resulting in a clean break of the coating 74 from the casting drum 32.

The combination of a cooled casting drum exterior face 82 and the use of infrared drying units 34, guarantees that the weakest interface will be between the coating and the casting drum 32 in the present invention. The cooled surface will allow for virtually no drying between the coating and casting drum which will greatly decreased adhesive forces and allow for no static bonding forces between the coating 74 and casting drum 32.

Since the cooled casting drum exterior face 82 is essentially a no stick surface, the use of preapplied, water base stripping adhesive can be avoided. This will improve the internal cohesion of the coating layer along with the tackified binders at the exposed film surface during a high solids operation which will be used to attract the coating to the substrate.

Because stripping adhesives and wetting or rewetting of the substrate and coating are unnecessary, picking and marring of the coating surfaces on the substrate can be avoided. The chilled exterior face of the casting drum 32 is particularly useful for protecting finished surfaces of thermally reactive coatings during drying at reduced rates and lower temperatures. Because binder migration and coating diffusion will be controlled during the drying, this will allow for less variation and a more consistent product with less waste. Since the effects of binder migration are greatly reduced by treating the coating with infrared drying units 34 and chilling the exterior face 40 of the casting drum 32, printability will be much more consistent and will be improved without using additional binder ingredients in the coating.

In the precast coater of FIGS. 1, 2 and 3 synthetic binders such as polyvinyl acetate or some latexes can be substituted for natural binders such as casine or converted starch in the coating. Therefore, the arrangement of FIGS. 1, 2 and 3 is applicable to a hot melt application since these synthetic binders have a relatively low melting point (less than 190° F.). Therefore, the potential to coat totally dry is possible by effectively converting a water based coating into a hot melt adhesive.

The operational steps of the FIGS. 1, 2 and 3 design would be distributing the coating, metering the coating, drying the coating to approximately zero percent moisture and melting the adhesive binder in the coating layer. Then, the coating would be applied with the melted binder to the substrate 46. Thereafter, the melted binder would be cooled and set on the substrate. This mechanical hot melt adhesive action is very effective particularly for porous substrates. Without using hot melt synthetic binders, an estimate of an applied solids level in the coating would be approximately 80 percent.

Figure 7D:
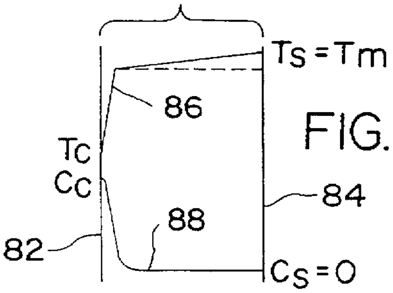

The use of these infrared drying units 34 with the cooling system 52 causes the second side of the coating exposed to the infrared drying units 34 to likely be at a higher temperature than the rest of the coating layer because the evaporation rate diminishes during drying. This temperature profile would facilitate the hot melt effect at the substrate surface when the coating is applied as compared to the temperature and moisture profiles of the prior art. Such a mechanical pseudo-hot melt arrangement is illustrated in FIGS. 6*d* and 7*d* as noted above in the discussion of these figures.

The present invention and method allow for faster, more compact and easier operation without additional adhesive coating being applied to the substrate. In the present method, a coating is continuously applied to the exterior face 40 of the casting drum 32. The coating will have a first side adjacent the exterior face 40 of the casting drum and a second side distal therefrom. It is the second side of the coating which will face the infrared drying units 34 as the coating rotates on the casting drum 32. The coating will be dried by the infrared drying units 34.

In the present method, the exterior face 40 of the casting drum 32 will be cooled by the cooling system 52 during at least the step of infrared drying. Due to this infrared drying and cooling, bonding of the coating to the casting drum 32 will be avoided. A substrate 46 will be pressed against the coating by the backing roll or impression roll 44. The coating will be removed from the casting drum 32 and thereafter applied to the substrate 46. Picking or marring of the coating will be prevented due to the lack of bonding between the coating 74 and the casting drum 32.

It is not necessary to continually clean the casting drum 32 of the present invention because the coating will not stick thereto. In the present invention, the coating will be dried and become tacky before being applied to the substrate. This is a radical departure from prior art processes that teach drying of the coating after its application onto the substrate. In the present invention, a meltable binder can be used as noted with respect to the hot melt application. This meltable binder will become tacky to further adhere the coating to the ultimate substrate 46.

The ability to apply nearly dry or totally dry coatings to the substrate regardless of incoming rheology (water content) is possible with the present invention. This ability positively impacts and can in fact eliminate water-substrate interaction problems. Such problems include baggy rolls, tunnel wrinkles, dryer induced sheet curl, poor sheet aspect and cockle. It should be noted that the elimination of water before the application of coatings to the substrate allows more forgiveness and latitude in making paper and other substrate operations. The manufacturer can then focus on mechanical and physical aspects of the substrate with less concern for external sizing and other requirements for making the substrate tolerant to rewetting.

With the present precast coater and method, a dry coating film that will not penetrate the sheet when applied can be created, if so desired. This attribute provides for much more effective use of the coating by keeping the coating at the surface of the substrate 46. This is particularly cost effective for carbonless and other expensive coatings. Also, the need for undercoating and size press starch application can be eliminated.

Because the coating can be maintained at the surface and a good coating of the substrate can be obtained, better substrate coverage is provided with the present invention. This allows for more tolerance to dirt or "hickies" and makes the substrate more viable to coating colors on white base stock. This allows for simplified substrate manufacturer, for example, and reduces inventories. Also, the problem of dual side carbonless coating interactions through the sheet (bleedthrough, through bluing) are greatly improved or eliminated and base sheet pin holes are not a serious problem with the present invention.

Because the finished surface of the coating is always against the casting drum 32, certain problems found in the prior art can be avoided. For example, film split patterns and streaks associated with roll metering devices, rods and blades would be of little consequence since the finished surface of the coating of the present invention is against the casting drum 32. Hence, the finished surface appearance of the coating is always controlled, the metered surface of the coating is against the substrate.

Base stock interchangeability will also be improved for different grades since the degree of coating to the base stock interaction with water is greatly reduced in the present invention.

Another benefit with the present invention is that the cast surface of the coater allows for a coating film to be extremely smooth without the need for compaction. This coater can also be used to obtain highly glossed finishes without calendering. This last aspect can be controlled by allowing the cooling system 52 to increase the temperature of the casting drum 32 to influence the amount of coating set.

The need to calender on some coated grades can also be eliminated in the present invention. Moreover, off-line calendering or supercalendering can be eliminated or reduced with the present invention. Therefore, the number of steps required in producing a coated substrate as well as the total time and cost can be reduced with the present invention.

Apart from avoiding certain calendering, the present invention will substantially reduce or eliminate the need for air floatation dryers, web carrying drying cylinders, belt conveyor ovens or other coated web drying devices. Moreover, the need for steam decurling or other decurling unit operations can be reduced or eliminated allowing for greater coater speed. The length, size and complexity of the coaters can also be reduced with respect to the carrier rolls and frame work.

With the present invention, the number of coating unit operations and coater operating costs is also reduced compared to the prior art. Maintenance and process controls can be positively effected. Capital cost to produce a product can therefore be reduced due to the elimination of certain devices from conventional coaters.

The present invention also improves efficiency and reduces cost because shrinkage of the substrate associated with wet coating can be eliminated or greatly reduced. A more accurate trim is provided thereby reducing waste and its associated cost.

The present invention also has the potential to reduce curling since the substrate 46 is exposed to considerably less water. This arrangement can also potentially reduce cost of applying coating by eliminating the need for large energy intensive drying assemblies and decurling steam showers or other decurling devices.

If the substrate had to be wetted or rewetted, other problems can arise. For example, gelatin capsules can be used for carbonless coatings in the present invention without drawbacks associated with wetting the substrate provided a suitable coating metering device is used with the casting drum. In fact, the accuracy of on-line coating measurements relating to moisture and coat weight can be improved by measuring the coating on the controlled surface of the casting drum in the present invention. Multiple coating layers can be applied without repeated rewettings in the present invention. This not only reduces the steps required for producing the final substrate, but avoids certain problems associated with wetting of the substrate.

An additional way for saving money with the present precast coater and method is that lower binder levels can be used in the coating formula as compared to conventional precast coating formulas. This advantage is provided by the improved release capability of this cooled casting drum and the improved control of binder migration in the coating film. Also, the ability to design, make up and apply coatings at a rheology and solid content that is optimal with respect to blending, mixing, metering, application and functional properties can be had without consideration of the effects of excess water on the substrate.

FIG. 4 shows an extrusion coater of the present invention which uses an extruder 30. FIG. 4 shows surface treatment devices 120 such as a corona discharge or flame treatment devices substituted in place of infrared drying units.

The arrangement shown in FIG. 4 has advantages with respect to making certain extruded films. Such advantages include the extruded films having more time to be flame treated, oxidized or corona treated before the film is bonded to the substrate 46. This arrangement allows for less film shrinkage and therefore higher speeds since the extruder nozzle 92 can be place in close proximity to the exterior face 40 of the casting drum 32.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A method for coating paper comprising the steps of:

supplying a coating to a casting drum, the coating being continuously applied on an exterior face of the casting drum and the coating on the casting drum having a first side adjacent the exterior face of the casting drum and a second side distal from the exterior face of the casting drum;

infrared drying the coating by applying heat from infrared drying units to the second side of the coating;

cooling the exterior face of the casting drum during the step of infrared drying;

avoiding bonding of the coating to the casting drum by the step of infrared drying of the second side and the step of cooling;

moving paper into contact with the coating on the casting drum downstream from the infrared drying units; and removing the coating from the casting drum by applying the coating directly to the paper.

2. The method as recited in claim 1, wherein the step of infrared drying comprises drying the coating until the second side becomes tacky.

3. The method as recited in claim 2, further comprising the steps of;

avoiding application of adhesives to the second side of the coating, the tacky second side of the coating adhering the coating to the paper;

maintaining pliability of all of the coating while the coating is on the casting drum, the step of cooling aiding in maintenance of pliability of the coating; and maintaining a level of dryness for the coating obtained during the step of infrared drying, the step of maintaining dryness including avoiding wetting of the coating on the casting drum and avoiding wetting and rewetting of the paper before and after the coating is applied thereto.

4. The method as recited in claim 1, wherein the coating has synthetic binders and wherein the step of infrared drying comprises drying the coating until the second side is heated beyond a melting point of the synthetic binders.

5. The method as recited in claim 4, further comprising the steps of;

avoiding application of adhesives to the second side of the coating, melting of the synthetic binders adhering the second side of the coating to the paper;

maintaining pliability of all of the coating while the coating is on the casting drum, the step of cooling aiding in maintenance of pliability of the coating; and maintaining a level of dryness for the coating obtained during the step of infrared drying, the step of maintaining dryness including avoiding wetting of the coating on the casting drum and avoiding wetting and rewetting of the paper before and after the coating is applied thereto.

6. The method as recited in claim 1, wherein the steps of infrared drying and cooling vary temperature and water concentration of the coating, the second side of the coating always having a higher temperature and a lower water concentration than the first side when the coating is on the casting drum after the step of infrared drying has begun.

7. A method for coating a substrate according to claim 1, wherein the supplying step includes supplying an aqueous coating to the casting drum, the aqueous coating being dried by the drying unit to form a substantially dry film, and further wherein the applying step includes applying the substantially dry film directly to the paper.

8. A coater comprising:

a rotatable casting drum having an exterior face;

means for supplying a coating to the casting drum, the coating being continuously applied to the exterior face of the casting drum by the means for supplying and the coating being rotatable with the casting drum, the coating having a first side adjacent the exterior face of the casting drum and a second side distal from the exterior face of the casting drum;

means for avoiding bonding of the coating to the casting drum, the means for avoiding including;

infrared drying units surrounding a portion of the casting drum, the infrared drying units facing the second side of the coating and drying the coating, and means for cooling the exterior face of the casting drum, the means for cooling being located within the casting drum; and a rotatable roll adjacent the casting drum, the roll moving paper against the coating on the casting drum to transfer the coating from the casting drum directly to the paper, the roll being located downstream of the infrared drying units.

9. The coater as recited in claim 8, wherein the casting drum has a predetermined diameter and wherein the infrared drying units surround a majority of the diameter of the casting drum, the infrared drying units being operable to dry the coating to a selected level, the level of drying for the coating being variable by an operator.

10. The coater as recited in claim 8, wherein the infrared drying units are high-intensity infrared drying units.

11. The coater as recited in claim 8, wherein the exterior face of the casting drum has a reflective coating, infrared energy from the infrared drying units being reflected by the reflective coating.

12. The coater as recited in claim 8, wherein the means for supplying comprises one of a rod coater, a blade coater, a three roll applicator, an air knife, a four roll applicator, and an extruder.

13. The coater as recited in claim 8, wherein the means for cooling comprises a cooling system provided inside the casting drum, the cooling system including fluid passages extending to an area adjacent the exterior face of the casting drum.

14. The coater as recited in claim 8, wherein the coating is supplied to the casting drum in aqueous form and the infrared drying unit dries the aqueous coating to form a substantially dry film, and further wherein the rotatable roll transfers the substantially dry film directly to the paper.

15. A coater comprising:

a rotatable casting drum having an exterior face;

a coating supply for continuously applying a coating to an exterior face of the casting drum, the coating having a first side adjacent the exterior face of the casting drum and a second side distal form the exterior face of the casting drum;

infrared drying units surrounding a portion of the casting drum the infrared drying units facing the second side of the coating and drying the coating;

a cooling system within the casting drum for cooling the exterior face of the casting drum; and a rotatable roll adjacent the casting drum, the roll moving paper against the casting drum to transfer the coating from the casting drum directly to the paper, the roll being located downstream of the infrared drying units, the infrared drying units and the cooling system avoiding bonding of the coating to the casting drum.

16. The coater as recited in claim 15, wherein the casting drum has a predetermined diameter and wherein the infrared drying units surround a majority of the diameter of the casting drum, the infrared drying units being operable to dry the coating to a selected level, the level of drying for the coating being variable by an operator.

17. The coater as recited in claim 15, wherein the infrared drying units are high-intensity infrared drying units.

18. The coater as recited in claim 15, wherein the exterior face of the casting drum has an infrared reflective coating, infrared energy from the infrared drying units being reflected by the infrared reflective coating.

19. The coater as recited in claim 15, wherein the coating supply comprises one of a rod coater, a three roll applicator, a four roll applicator, and an extruder.

20. The coater as recited in claim 15, wherein the cooling system includes fluid passages extending to an area adjacent the exterior face of the casting drum.

21. The coater as recited in claim 15, wherein the coating is supplied to the casting drum in aqueous form and the infrared drying unit dries the aqueous coating to form a substantially dry film, and further wherein the rotatable roll transfers the substantially dry film directly to the paper.

* * * * *